United States Patent
Ramasamy et al.

(10) Patent No.: US 6,728,694 B1
(45) Date of Patent: Apr. 27, 2004

(54) SET CONTAINMENT JOIN OPERATION IN AN OBJECT/RELATIONAL DATABASE MANAGEMENT SYSTEM

(75) Inventors: Karthikeyan Ramasamy, Madison, WI (US); Jignesh M. Patel, Ann Arbor, MI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/550,707

(22) Filed: Apr. 17, 2000

(51) Int. Cl.$^7$ .............................................. G06F 17/30
(52) U.S. Cl. ................................ 707/2; 707/1; 707/102
(58) Field of Search .............................. 707/1–10, 100, 707/101, 102, 103, 104

(56) References Cited

U.S. PATENT DOCUMENTS

| | | | | |
|---|---|---|---|---|
| 5,247,696 A | * | 9/1993 | Booth | 717/150 |
| 5,325,525 A | * | 6/1994 | Shan et al. | 709/104 |
| 5,522,077 A | * | 5/1996 | Cuthbert et al. | 707/103 R |
| 5,701,467 A | * | 12/1997 | Freeston | 707/100 |
| 5,857,180 A | * | 1/1999 | Hallmark et al. | 707/2 |
| 5,960,194 A | * | 9/1999 | Choy et al. | 707/102 |
| 5,970,490 A | * | 10/1999 | Morgenstern | 707/10 |
| 6,003,036 A | * | 12/1999 | Martin | 707/102 |
| 6,016,397 A | * | 1/2000 | Ogasawara et al. | 717/160 |
| 6,226,629 B1 | * | 5/2001 | Cossock | 707/3 |

OTHER PUBLICATIONS

"Synthesizing Transformations for Locality Enhancement of Imperfectly–Nested Loop Nests"—Nawaaz Ahmed, Nikolay Mateev and Keshav Pingali—Proceedings of the 14th International Conference on Supercomputing, ACM May 2000, (pps: 141–152).*

"Partition Based Spatial—Merge Join"—Jignesh M. Patel and David J. DeWitt, Computer Science Department, 1996 ACM 0–89791–794–4/96/0006, pp. 259–270.*

"Separation Set Partitioning: Algorithm to Partition Non-strict Programs into Sequential Threads"—Changmo Yang, Hyeongseok Joo and Weonhee Yoo—1060–3425/97—1997 IEEE, pp. 626–627.*

"Global Analysis for Partitioning Non–Stric Programs into Sequential Threads"—Kenneth R. Traub and David E. Culler 1992 ACM LISP & F.P. 6/92/CA—1992 ACM 0–89791–483–X/92/0006/0342, pp. 324–334.*

"Evaluation of Main Memory Join Algorithms for Joins with Subset Join Predicates"—Sven Helmer and Guido Moerkotte—Proceedings of $23^{rd}$ VLDB conference, Athens, Greece, 1997, pp. 386–395.*

S. Helmer & G. Moerk, "Evaluation of Main Memory Join Algorithms for Joins with Subset Join Predicates," Proceedings of the $23^{rd}$ VLDB Conference, Athens, Greece, 1997, pp. 386–395.

* cited by examiner

Primary Examiner—Kim Vu
Assistant Examiner—Anh Ly
(74) Attorney, Agent, or Firm—Gates & Cooper LLP

(57) ABSTRACT

A novel partition-based set containment join algorithm, known as Set Partitioning Algorithm (SPA), is performed by a relational database management system to aggressively partition set-valued attributes into a very large number of partitions, in order to minimize the impact of excessive replication and improve performance.

33 Claims, 10 Drawing Sheets

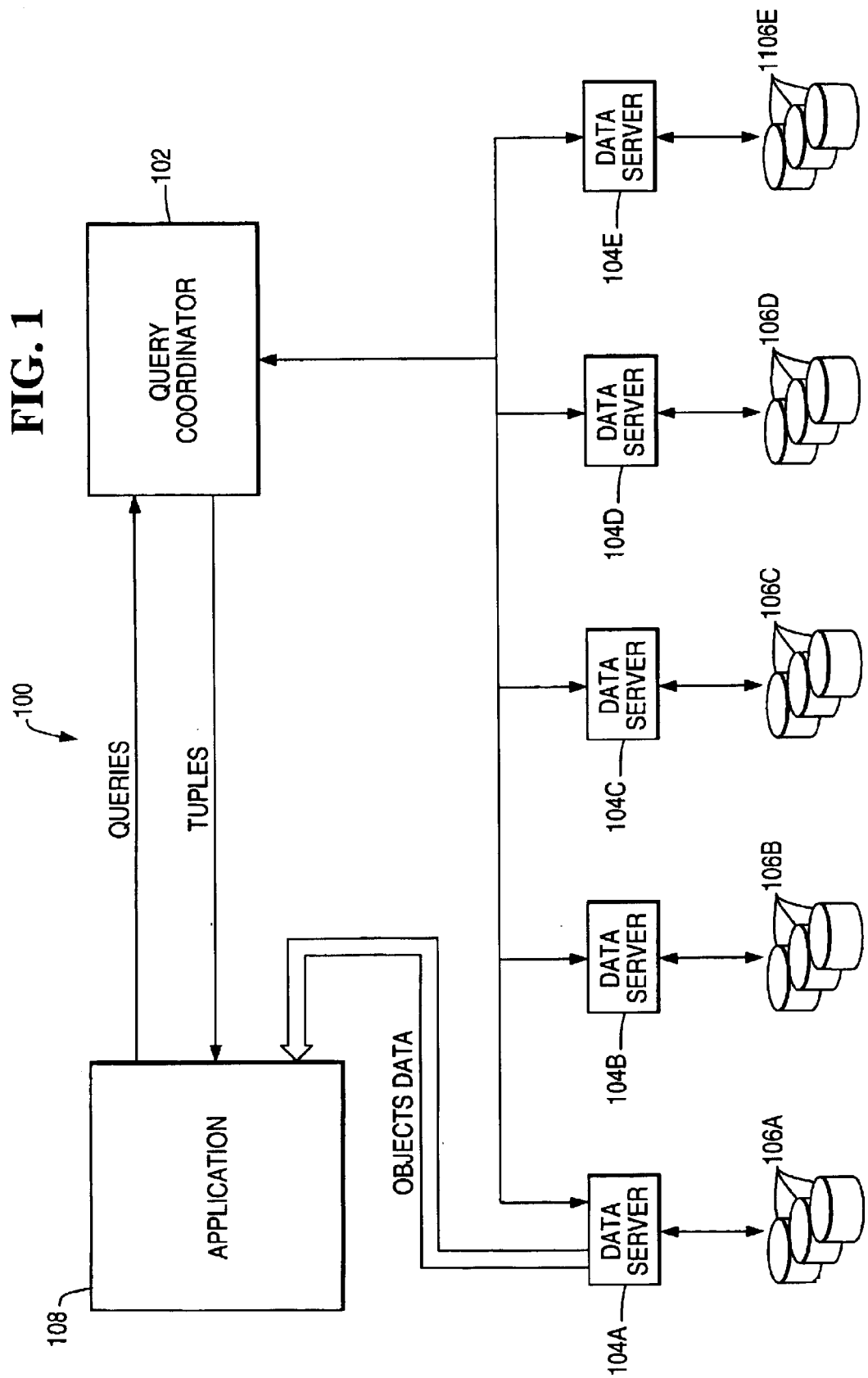

SET CONTAINMENT JOIN OPERATION IN AN OBJECT/RELATIONAL DATABASE MANAGEMENT SYSTEM

CROSS REFERENCE TO RELATED APPLICATIONS

This application is related to the following co-pending and commonly assigned patent applications, all of which are incorporated by reference herein:

Application Ser. No. 09/474,040, entitled "METHOD AND APPARATUS FOR EVALUATING INDEX PREDICATES ON COMPLEX DATA TYPES USING VIRTUAL INDEXED STREAMS" filed on Dec. 28, 1999, by Jignesh M. Patel and Navin Kabra;

Application Ser. No. 09/470,228, entitled "METHOD AND APPARATUS FOR USING JAVA AS A STORED PROCEDURE LANGUAGE AND AS AN EMBEDDED LANGUAGE ON A CLIENT" filed on Dec. 22, 1999, by Ashutish Singh, Jignesh M. Patel, and Navin Kabra;

Application Ser. No. 09/470,228, entitled "METHOD AND APPARATUS FOR PARALLEL EXECUTION OF TRIGGER ACTIONS" filed on Dec. 22,1999, by Navin Kabra, Jignesh M. Patel, Jie-Bing Yu, Biswadeep Nag, and Jian-Jun Chen;

Application Ser. No. 09/470,215, entitled "METHOD AND APPARATUS FOR PARALLEL EXECUTION OF SQL FROM WITHIN USER DEFINED FUNCTIONS" filed on Dec. 22, 1999, by Navin Kabra, Jignesh Patel, Jie-Bing Yu, Biswadeep Nag, and Jian-Jun Chen;

Application Ser. No. 09/470,927, entitled "METHOD AND APPARATUS FOR PARALLEL EXECUTION OF SQL FROM STORED PROCEDURES", filed on Dec. 22, 1999, by Navin Kabra, Jignesh Patel, Jie-Bing Yu, Biswadeep Nag, and Jian-Jun Chen;

Application Ser. No. 09/449,704, entitled "METHOD AND APPARATUS FOR FETCHING ARRAY BASED OBJECTS BY DIRECT DELIVERY AND BATCHING" filed on Nov. 24, 1999, by Biswadeep Nag, Jie-Bing Yu, Jignesh M. Patel, and Zhe Wang;

Application Ser. No. 09/449,085, entitled "QUERY MONITOR PLAYBACK MECHANISM FOR POST-MORTEM PERFORMANCE ANALYSIS" filed on Nov. 24,1999, by Karthikeyan Ramasamy, Jie-Bing Yu, and Jun Li.

BACKGROUND OF THE INVENTION

1. Field of the Invention

This invention relates in general to database management systems performed by computers, and in particular, to a set containment join operation performed in an object/relational database management system.

2. Description of Related Art (Note: This application references a number of different publications as indicated throughout the specification by reference numbers enclosed in brackets, e.g., [x]. A list of these different publications ordered according to these reference numbers can be found in the "Detailed Description of the Preferred Embodiment" in Section 6 entitled "References." Each of these publications is incorporated by reference herein.)

The data modeling community has long realized that set-valued attributes provide a concise and natural way of modeling complex data [RKS88]. Recently, there has been a resurgence of interest in set-valued attributes from two different perspectives. First, commercial O/R DBMS's (Object/Relational DataBase Management Systems) are beginning to support set-valued attributes, which is likely to lead to their use in "real" applications. Second, the rise of XML (eXtensible Markup Language) as an important data standard increases the need for set-valued attributes, since it appears that set-valued attributes are key for the natural representation of XML data in O/R DBMS's [JAI99].

Unfortunately, although sets have been fairly well studied from a data-modeling viewpoint, very little has been published about the efficient implementation of operations on set-valued attributes. Thus, there is a need in the art for improved operations over set-valued attributes, and in particular, there is a need in the art for a set containment join operation.

SUMMARY OF THE INVENTION

The present invention discloses a method, apparatus, and article of manufacture for performing a novel partition-based set containment join algorithm, known as Set Partitioning Algorithm (SPA). The SPA is performed by a relational database management system to aggressively partition set-valued attributes into a very large number of partitions, in order to minimize the impact of excessive replication and improve performance.

BRIEF DESCRIPTION OF THE DRAWINGS

Referring now to the drawings in which like reference numbers represent corresponding parts throughout:

FIG. 1 illustrates an exemplary software and hardware environment that could be used with the present invention;

DETAILED DESCRIPTION OF THE PREFERRED EMBODIMENT

Figure 2A:
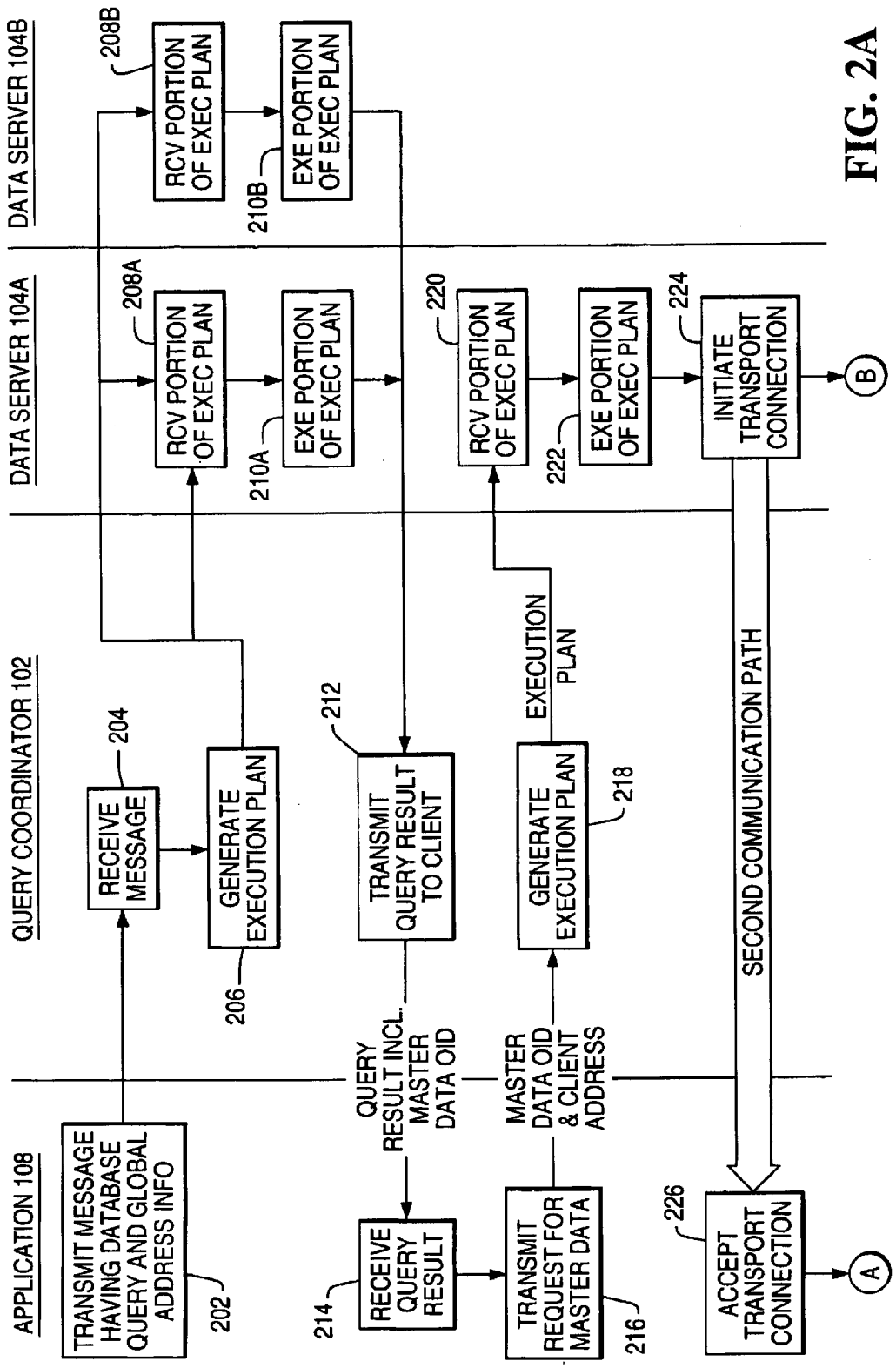
FIG. 2 is a flow chart illustrating the steps necessary for the interpretation and execution of SQL statements, or other user interactions, according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Set-valued attributes have long been studied by the data modeling community. However, it is only recently, with the advent of commercial O/R DBMS's (Object/Relational DataBase Management Systems) supporting set-valued attributes, that the thorny issue of performance of operations over set-valued attributes has become apparent and relevant. The need to resolve these implementation issues has received still more weight with the emergence of XML (eXtensible Markup Language), since the natural representations of XML documents in an O/R DBMS relies upon set-valued attributes.

Joins based on set containment are an important example of an operation on set-valued attributes, because they provide a concise and elegant way to express otherwise complex queries. Unfortunately, evaluating these joins is difficult and can be very expensive; in fact, the published literature indicates that the best way to evaluate these joins is a variant of a nested loops join algorithm.

The present invention comprises a Set Partitioning Algorithm (SPA), i.e., a novel partition-based set containment join algorithm. The essential insight of SPA is that partitioning the inputs to a set containment join in general yields no speed up, due to excessive replication between the partitions. However, perhaps counter-intuitively, if there is an aggressive partition into a very large number of partitions, the impact of this replication is reduced and performance improves.

Hardware and Software Environment

FIG. 1 illustrates an exemplary hardware and software environment that could be used with the present invention. In the exemplary environment, a computer system 100 implements an O/R DBMS (Object/Relational DataBase Management System) in a client-server architecture, wherein the O/R DBMS comprises a query coordinator 102 and one or more data servers 104A–104E storing an object/relational database in one or more data storage devices 106A–106E. The query coordinator 104 and data servers 104 maybe implemented in separate machines, or may be implemented as separate or related processes in a single machine. A further description of the O/R DBMS used in the preferred embodiment, known as Paradise, can be found in [JP97].

The O/R DBMS supports standard attribute types, such as integers, characters, floating points, etc., as well as objects, such as text, images, audio, video, etc. Objects are defined with Abstract Data Types (ADT). The objects persist in the object/relational database, such that they may be retrieved and used instead of creating a new instance of an object.

The O/R DBMS also supports type constructors in form of sets, the elements of which are set-valued attributes. Set-valued attributes can be combined with any of the known base type or extended types. Sets differ from other type constructors because of the uniqueness of the set-valued attributes contained therein. Such set-valued attributes are useful to express logical collection (e.g., a set of hobbies, a set of books read, a set of movies seen, etc.). With the advent of XML, such set-valued attributes can be naturally used to express the hierarchical tree-like structure of XML documents.

For the most part, the O/R DBMS uses standard algorithms for performing basic relational operations against the contents of the object/relational database. These relational operations may be invoked using SQL commands to interact with and manipulate the contents of the object/relational database. Alternatively, data in the object/relational database may be wrapped or encapsulated by an instantiated class definition that provides an interface to the O/R DBMS to retrieve, insert, update, delete, etc., the contents of the object/relational database.

In the preferred embodiment, the system 100 may use any number of different parallelism mechanisms. Tables within the object/relational database may be fully partitioned across all data storage devices 106 in the system 100 using round robin, hash, spatial declustering, or other partitioning methods. Generally, the data servers 104 perform operations against the object/relational database in a parallel manner as well.

For example, the query coordinator 102 receives a query from an application 108, such as a graphical user interface (GUI) or other front-end application. After parsing and optimization, the query coordinator 102 generates an execution plan for the query, parallelizes the query execution plan, and transmits the parallel portions of the query execution plan to the appropriate data servers 104 for execution. Query results including parallel result sub-sets are collected by the query coordinator 102 for delivery back to the application 108.

Operation of the O/R DBMS

Figure 2B:
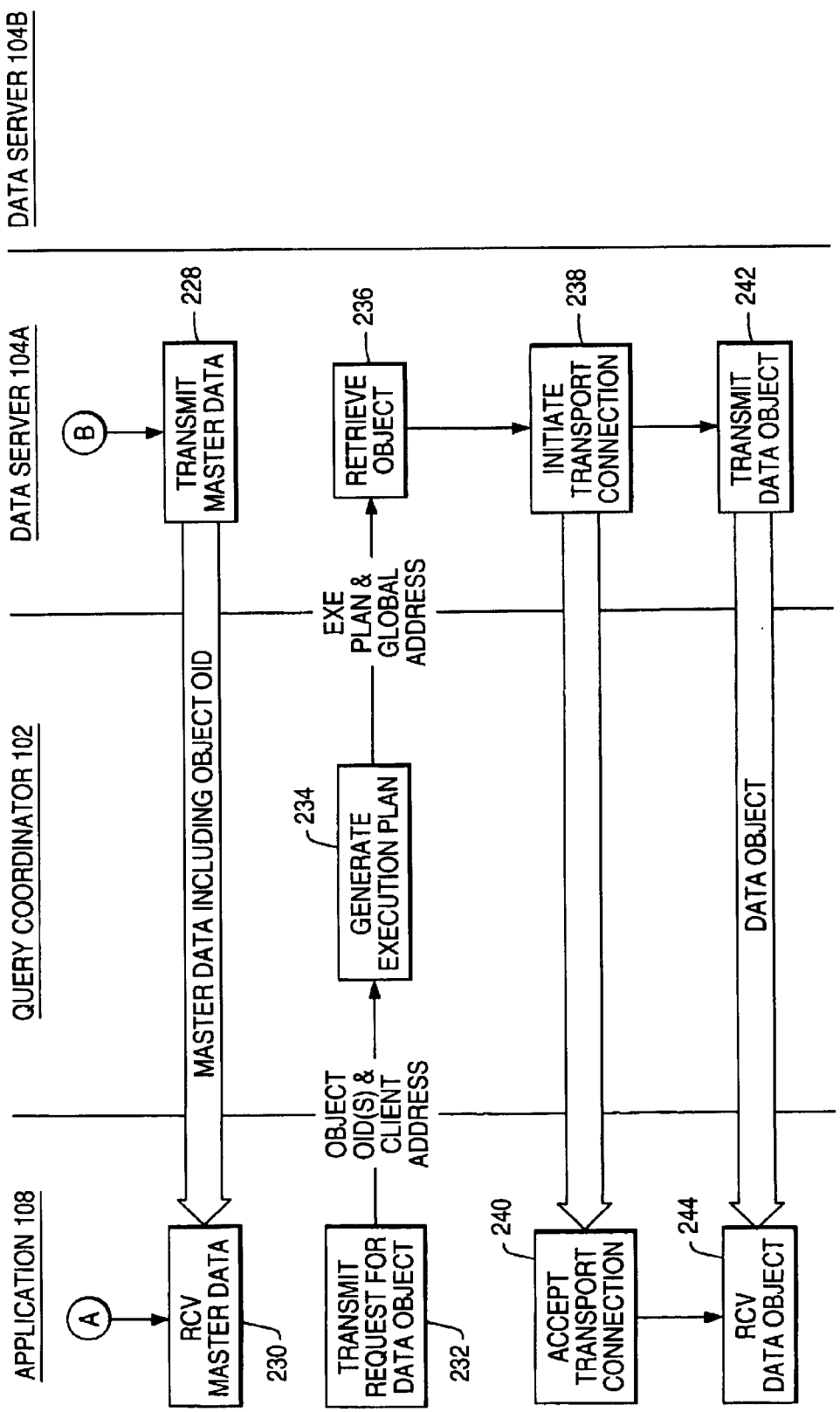

FIGS. 2A and 2B together are a dataflow diagram illustrating the operation of the O/R DBMS according to a preferred embodiment of the present invention. The application 108 transmits 202 a message, for example, a query, to the query coordinator 102. The query coordinator 102 receives 204 the message and generates 206 a query execution plan that includes parallel portions. The parallel portions are transmitted to their respective data servers 104, which receive 208 and execute 210 their respective portions of the query execution plan. Results from the data servers 104 are transmitted to the query coordinator 102, which compiles the results into a query result having a result set. This information is transmitted 212 back to the application 108. In one embodiment, these query results information include an object identification (OID) for a master data (MOID). Other information may also be included, such as the dimensions and size of the master data.

It is important to note that master data associated with the MOID (that which is responsive to the query can be quite large. Hence, while the master data could be delivered via the query coordinator 102 to the application 108, direct transfer from the data server 104 in such cases best accomplishes such delivery.

The application 108 transmits 216 a request for the master data. Included in this request is the OID for the master data (the MOID). The query coordinator 102 accepts this message, and from the information in the message, generates 218 another query execution plan. This query execution plan is simpler than the one generated previously, as it typically only requires the generation of a fetch object operator. Alternatively, the MOID can be transmitted from the application 108 to the data server 104 without intervention of the query coordinator 102, or the query coordinator 102 can simply accept the request for the master data and pass it along to the data server 104.

Each of the data servers 104A–E receives 220 and executes 222 the applicable portion of the query execution plan, and initiates 224 a transport connection with the application 108. The application 108 accepts 226 the transport connection. The data server 104 then transmits 228 the master data via the transport connection to the application 108, which receives 230 the master data. In one embodiment, the master data includes information such as the dimensions and size of the related master object, and an object identification (AOID) for the data objects associated with the master data object.

The application 108 may then request one or more data objects in an array that cumulatively represents the master data object. This data is represented in one of the data objects, having related object identifications (AOIDs) that were transmitted with the master data object. That request can be submitted by transmitting 232 a message including the AOIDs of the data objects of interest to the query coordinator 102. The query coordinator 102 again generates 234 a query execution plan designed to retrieve the data objects of interest from the data server 104. The applicable portions of the query execution plan are sent to the data servers 104A–E, each of which retrieves 236 the objects from the object/relational database.

In one embodiment, each of the data servers 104A–E then initiates 238 a transport connection with the application 108. The application 108 accepts 240 the transport connection. In another embodiment of the present invention, the transport connection originally established with the application 108 (in block 224) is maintained for the duration of the session with the application 108. In this embodiment, there is no need to re-establish the transport connection between the data server 104 and the application 108. In any case, the data server 104 transmits 242 the requested data object, and the application 108 receives 244 the requested data object.

Operation of the Set Partitioning Algorithm

1 Introduction

Sets are implemented using an Abstract Data Type (ADI) mechanism of the O/R DBMS. The set ADT implements a number of set-oriented methods, including: create-iterator that returns an iterator over the set-valued attributes that comprise elements of the set; and set operators that are implemented by type specific methods that are invoked by the O/R DBMS when comparison and assignment operations are performed on sets. For more details on these implementations, refer to [KR99, KRJ99].

Signature nested loops (SNL) and the set partitioning algorithm (SPA) are implemented as join algorithms in the system 100, and the O/R DBMS is extended to recognize set containment join operations in queries. For the unnested, external join algorithm, magic set optimization is used to rewrite the correlated nested query into the following three queries: a count query to determine the cardinality of the set-valued attributes in a relation R, a candidate generation query to generate the pairs of sets that are candidates for the final result, and a verification query that uses the results of the count query to check if each candidate set pair has the same number of elements as the sets in R.

According to the preferred embodiment of the present invention, the O/R DBMS implements a particularly challenging operation over set-valued attributes, which operation is known as the set containment join. Many real word queries can be easily expressed using set containment joins.

For example, consider two relations:

STUDENT (sid, {courses})

COURSES (cid, {pre-requests})

A frequently asked query may be to find the courses that the students are eligible to take. Such a query can be easily expressed as a set containment join as shown below.

SELECT sid, cid

FROM STUDENT, COURSES

WHERE COURSES.pre-requests $\subseteq$ STUDENT.courses wherein $\subseteq$ is a set containment join operator. Other set containment operators include, inter alia, $\supseteq$, $\subset$, $\supset$, $\not\subset$, $\cup$, and $\cap$.

Another motivating example arises from possible Internet applications. Consider a simple relation that describes a document and set of hyper-links that point to it:

DOCUMENT(did, {hyper-links-in}, actual-document)

Suppose the query examines the relative "importance" of documents, where document d1 is more "important" than a document d2 if d1 is linked to by a superset of the documents that link to d2. The O/R DBMS can find pairs of documents related by this "importance" relation with the following query:

SELECR d1.did, d2.did

FROM DOCUMENT d1, DOCUMENT d2

WHERE d2.hyper-links-in $\subset$ d1.hyper-links-in

The algorithms available for implementing set containment joins depend upon how set-valued attributes are stored in the database. As described in [KR99], set-valued attributes can be stored in a nested internal representation (set-valued attributes are stored together with the rest of the attributes) or an unnested external representation (set-valued attributes are scattered and stored in separate relations). Current commercial O/R DBMS's use the unnested external representation.

Since the unnested external representation reduces to standard SQL2 relations "under the covers", set containment joins on the unnested external representation can be evaluated by rewriting the queries into SQL2 (with no sets) and evaluating these rewritten queries. On the other hand, with the nested internal representation, the most obvious algorithm for evaluating set containment joins is a nested loops join algorithm.

Two questions immediately arise: (1) Are there better algorithms than the nested loops join algorithm? (2) How do these algorithms compare in efficiency with the "rewrite it in SQL2" approach that is most logical for the unnested external representation?

This invention answers these questions by proposing, implementing, and evaluating the SPA for set containment joins over an nested internal representation. Partition-based algorithms certainly dominate join algorithms in scalar and spatial domains, so it is natural to suspect that a partition-based algorithm will be the algorithm of choice for set containment joins. However, it turns out that finding a good partitioning is an exceedingly difficult problem. There is some theoretical evidence to back up this statement from the theory of indexability [JMH97], in which the authors showed that given certain reasonable definitions and assumptions, set-valued attributes are at least as hard to index as attributes from any other domain, due to the non-existence of "good" partitioning schemes.

Test results using the present invention empirically agree with this observation. If the relations are partitioned to be joined into a number of partitions, similar to that which would be used by, say, hash join over scalar attributes, the performance actually degrades as compared to nested loops. This is primarily due to excessive replication of tuples to multiple partitions. However, it has been found that, perhaps surprisingly, if the relations are partitioned into a much larger number of partitions, the performance improves dramatically. This result was the basis for the SPA.

The present invention makes three main contributions. First, it presents the SPA algorithm for set containment joins. Second, it includes a performance study of three set containment algorithms: traditional SQL on the unnested external representation, and SNL and SPA on the nested internal representation. Finally, experimental results present a strong case for storing set-valued attributes in the nested internal form, since SPA and even SNL outperform the rewritten queries over the unnested external representation. The performance study is based on implementations of these algorithms in the Paradise [JP97] object relational database system.

2 Related Work

Joins have been studied extensively in relational [BLA76, BRA84, DW84, DWJ91] and spatial domains [LO96, JP96]. Pointer joins for efficiently traversing path expressions in object-oriented databases has also been studied extensively [DW93, SH90]. However, there is very little previous work on set containment joins.

The only known reported work are the publications by Helmer and Moerkofte [HEL96, HEL97]. These papers investigate nested loops algorithms for computing a set containment join. Two variants of nested loops, namely simple nested loops and signature nested loops, are examined in these publications. The signature nested loops first approximates the set-valued attribute using a bit vector, called a signature, and then uses the signature to speed up the evaluation of the join predicate.

In [HEL97], the authors also present a new algorithm, called a signature hash join, for evaluating a set containment join. This algorithm provides excellent performance when the signatures for all the tuples to be joined can simultaneously fit in main memory. Because of this large memory requirement, this algorithm is probably not appropriate as a general set containment join algorithm, since it cannot handle large joins (and may require more memory than an O/R DBMS is willing to allocate to a single join, even for smaller joins). However, it is an excellent candidate for an algorithm to join two partitions as part of a partition-based join. In this sense, their work is complementary to this invention. Their algorithm was not used in experimental testing; instead, a simpler algorithm for joining the partitions was used. The main conclusion is that SPA is faster than the signature nested loops join algorithm and the rewriting approaches, using a potentially faster algorithm for joining the partitions (such as the signature hash join algorithm), would only have strengthened the results.

3 Storage Representations and Previously Proposed Join Algorithms

In this section, storage alternatives for set-valued attributes are reviewed, as are previously proposed algorithms for evaluating set containment joins.

3.1 Storage Representations for Set-Valued Attributes

This section discusses the options for internally representing set-valued attributes. Various representations for set-valued attributes are possible depending on the following two characteristics: nesting (set-valued attributes are clustered or scattered) and location (set-valued attributes are either stored with the rest of the attributes internally or vertically partitioned and stored externally). As outlined in [KR99], the three key representations for sets are:

Nested Internal: Here, the set-valued attributes are grouped together and stored with the rest of the attributes in the tuple.

Unnested External: In this representation, the set-valued attributes are stored in a separate relation. For each set-valued attribute in a relation, two relations are created: (1) a base relation that stores the other non set-valued attributes and an identifier, and (2) an auxiliary relation that stores each occurrence of the set-valued attribute as a tuple.

Consider two relations, i.e., $R(a, \{b\})$ and $S(c, \{d\})$ containing set-valued attributes $\{b\}$ and $\{d\}$, respectively. Since set is a type constructor, attributes b and d can be of any arbitrary type and it is assumed that these types provide an equality predicate that compares the equivalence of two set-valued attributes. Also, no order among the set-valued attributes is assumed.

The relation $R(a,\{b\})$ is decomposed into two relations: $Rb(i,a)$ and $Rs(i,\{b\})$, where Rb is the base tuple and Rs contains all the set-valued attributes. Rb and Rs are related by the key attribute i. During query processing, a join is used to associate tuples in RB and Rs.

Nested External: This is similar to nested internal except that set-valued attributes are vertically decomposed and stored in an external relation. Thus, the number of tuples in Rb and Rs are the same as in the original relation R. As in unnested external, a join is used to associate the tuples in Rb with the tuples in Rs.

As shown in [KR99], for selections on set-valued attributes, the performance of the nested internal and the nested external representations are very similar. The same result is expected to hold for set containment joins, since any algorithm on the nested internal representation can be easily translated into an equivalent algorithm on the nested external representation with just one additional key-key scalar join. Consequently, this specification focuses only on set containment algorithms for the unnested external and the nested internal representations.

3.2 Join Algorithms for the Unnested External Representation

If set-valued attributes are stored in the unnested external representation, set containment joins can be expressed and evaluated using standard SQL2 constructs. This approach is important to study, because (a) it is the simplest to add to any O/R DBMS, and (b) all known commercial O/R DBMS's use this approach (perhaps because of (a)).

As shown in Section 3.1, in this representation, a relation with set-valued attributes is decomposed into two relations. A set containment operation can then be expressed using SQL over these decomposed relations. If R and S are the two relations being joined, and Rs and Ss are the corresponding decomposed auxiliary set relations, the set containment join can be expressed as follows:

SELECT Rs.i, Ss.j
FROM Rs, Ss
WHERE Rs.b=Ss.d
GROUP By Rs.i, Ss.j
HAVING COUNT(*)=(SELECT COUNT(*)
    FROM Rs
    GROUP By Rs.i)

This query joins the set relations and groups the pair of sets that have at least one element in common. Then, for each group, it checks whether the size of the group (which is the number of elements in common between the R set and the S set) is the same as the cardinality of the set in K This query, as written, returns in the answer tuples only the pair of set identifiers i,j that satisfy the containment. If any other attributes were included in the answer, additional joins would be required to "extract" them from the input relation.

The main problem with this approach is the efficiency of evaluation of this query. Since this is a correlated nested query, the nested query must be evaluated for each group.

Since the number of groups is proportional to |R|×|S|, the cost of evaluating the nested query naively can be prohibitively large.

A possible optimization is to use magic-sets rewriting [PS96] and transform the original query into a set of queries, thus evaluating the inner query only once (as opposed to once for every tuple produced by the outer block). Even after this transformation, each element in Rs is compared with every other element in Ss. Hence, the evaluation of the outer block (join followed by group-by) is likely to the dominating cost.

Experimental results show empirically that this approach performs very poorly unless the set sizes are small; in fact, in many cases it is so bad that the algorithm can arguably be called "ugly."

3.3 Nested Loop Algorithms for Nested Internal

Nested loop algorithms for set containment fall into two broad categories: naive nested loops and signature nested loops. In naive nested loops, the set containment predicate is evaluated on pairs of sets for the entire cross product of R and S. As shown in [HEL97], naïve nested loops performs poorly, as it is very expensive to compute the set join predicate for every tuple pair. Hence, naive nested loops are not considered for the remainder of this specification.

The signature nested loops algorithm attempts to reduce the cost of evaluating the containment predicate by approximating sets using signatures, which are fixed length bit vectors, and evaluating the join predicate by comparing these signatures. To compute the signature for a set, a function M is applied iteratively to every element in the set. The function maps the set element to a position in the bit vector, wherein the indicated bit is set to 1. Intuitively, signatures fold the domain of the set into a few bits.

Since signatures are only an approximate representation for the set (unless the signature length is equal to the size of the domain of the set), using signatures to evaluate a predicate will yield some "false hits". That is, two sets may have signatures that indicate containment, while the actual sets do not really satisfy the containment predicate. The actual sets must be examined to eliminate these false hits.

The following describes the signature nested loops algorithm. This algorithm operates in three phases: the signature construction phase, the probing phase, and the verification phase. During the signature construction phase, the entire relation R is scanned, and for every tuple ti ∈ R, a signature Si is constructed. A triplet (Ci, Si, OIDi) is computed and stored in an intermediate relation Rsig, wherein C is the set cardinality and OIDi is the physical record identifier (rid) of the tuple. The same process is repeated for the relation S and an intermediate relation Ssig is created. Next, the algorithm proceeds to the probing phase, where the tuples of Rsig and Ssig are joined. For every pair (C, Si, OIDI) ∈ Rsig and (Cj, Sj, OIDj) ∈ Ssig two conditions must be verified (i) Ci≦Cj and (ii) Si∧Sj=Si, where the wedge represents the bit-wise "and" of the two signatures. If both the conditions are satisfied, then the pair (OIDi,OIDj) is projected since it is a possible candidate for the result. During the final verification phase, the tuples referred to in the (OIDi,OIDj) pairs are fetched and the subset predicate is evaluated on the actual set instances, producing the final result.

The main issue in the signature nested loops algorithm is reducing the number of false hits to minimize the associated overhead of fetching the tuples and verifying the containment predicate. The false hit probability depends on the number of bits used in constructing the signature. The greater the signature length, the smaller will be the false hit probability. However, larger signatures lead to more bit comparisons per signature, thereby increasing the execution time of the probing phase. Hence, it is necessary that the chosen signature size be such that further increases in the number of bits do not significantly reduce the false hit probability. Finding such an optimal signature length is hard.

Note that even with the computation of signatures of an ideal length, this algorithm works by doing a signature comparison for every pair of tuples in the cross product of R and S. Running the numbers is discouraging—if R and S each have one million tuples, this is one million million comparisons. This is discouraging enough to be considered "bad."

4 Partition-based Algorithms for Nested Internal

In this section, a new algorithm is proposed over the nested internal representation that is based upon partitioning. In general, partition-based algorithms for joins (scalar and spatial) attempt to optimize join execution by partitioning the problem into multiple sub-problems. They use partitioning functions to decompose the join problem into several sub-problems that are much easier to solve.

First, the relation R is partitioned into k partitions, R1, . . . , Rk, using a partitioning function. Similarly, the relation S is partitioned into S1, . . . , Sk, using the same partitioning function. Note that this uses a generalization of the classical definition of "partitioning" in that one tuple may be mapped to multiple partitions.

An ideal partitioning function has the following characteristics:

(a) Each tuple r of relation R falls exactly in one of the partitions Ri ($1 \leq i \leq k$)

(b) Each tuple s of relation S falls exactly in one of the partitions Si ($1 \leq i \leq k$)

(c) The join can be accomplished by joining only Ri with Si ($1 \leq i \leq k$)

It is hard and expensive (and in some cases, impossible) to satisfy conditions (a) through (c) in non-scalar domains (spatial and set domains) as evident from the theory of indexability [JM97].

4.1 Is there Any Hope?

Given that one cannot, in general, expect to find a partition join that does not replicate tuples, one might ask if there is any hope of finding a good partition-based algorithm. In order to understand the problem better, the speed up provided by the partitioning algorithms is analyzed by using a very simple analytic model. For the sake of simplicity, assume that both relations R and S have N tuples. Also, assume that the join within the partitions is performed using something like signature nested loops. (A discussion of relaxing this assumption occurs later in this section.) If r is the replication factor and P is the number of partitions, then the overall cost of the partition-based algorithm, ignoring constants, is given by:

$$\sum_P \frac{rN \times rN}{P \times P}$$

On the other hand, the cost of the nested loop algorithm, again ignoring constants, is $N^2$. Hence, the speed up of the partition-based algorithm is proportional to $P/r^2$. But, things are not as simple as this looks, because r depends upon P. So, this dependence needs to be investigated.

The replication factor can be computed if an assumption is made that the set instances draw their elements from the domain uniformly. Furthermore, assume that the partitioning algorithm works by partitioning the elements of the domain from which the set is drawn. If a set has an element e, and e maps to a partition p, then the set itself must be mapped to partition p. From statistics [FEL57], assuming a large domain size, the expected number of partitions to which a tuple is replicated when its set instance has a cardinality of k is then given by:

$$k-k(1-1/k)^P$$

According to this equation, when the number of partitions is increased, the expected number of partitions approaches the value of k asymptotically (thereby bounding the replication to k). Hence, the speed up of partition-based algorithm can be rewritten as:

$$\frac{P}{(k-k(1-1/k)^P)^2}$$

Figure 3:
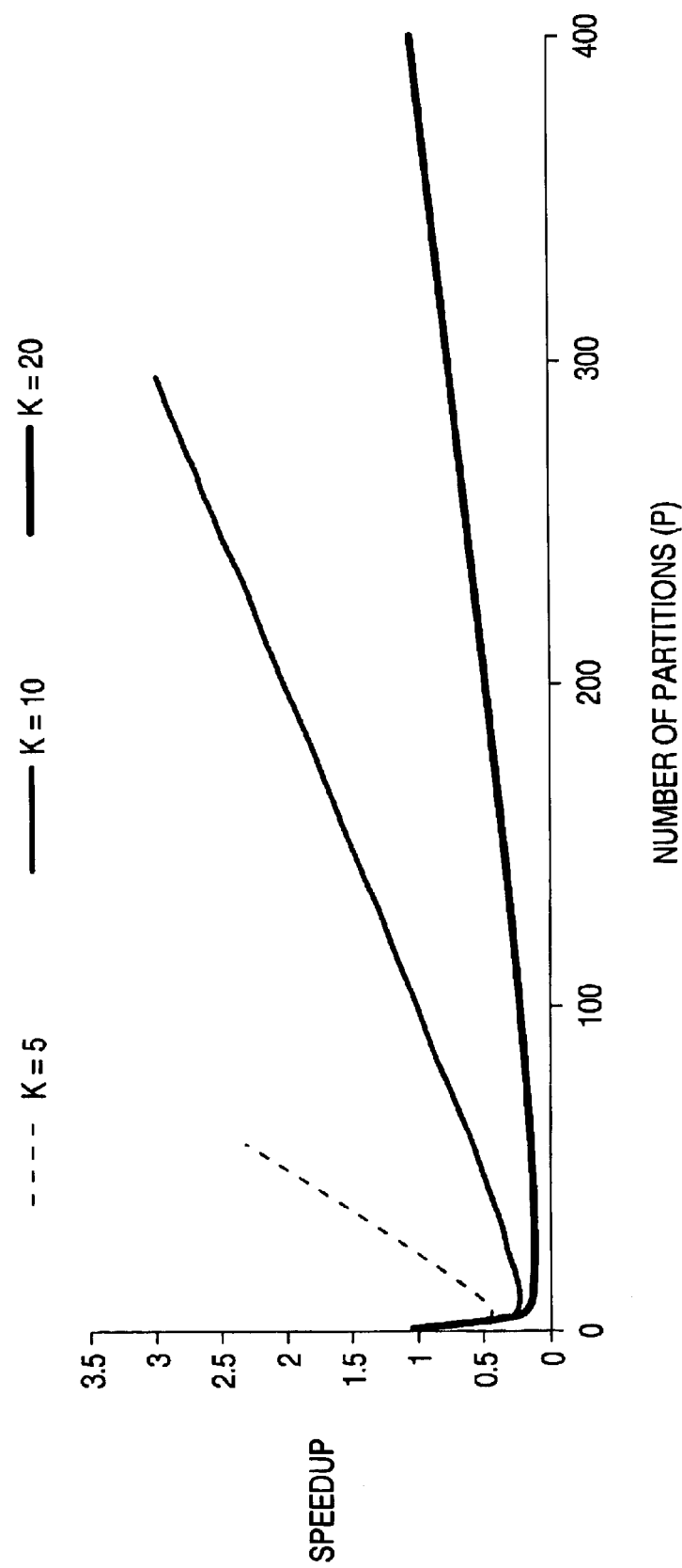
FIG. 3 is a graph illustrating the variation in speed up with the increase in partitions according to the preferred embodiment of the present invention.

When relations have different set cardinalities, the speed up can be easily rewritten $$\frac{P}{(k_R - k_R(1-1/k_R)^P) \times (k_S - k_S(1-1/k_S)^P)}$$

where $k_R$ is the average set cardinality of relation R and $k_S$ is the average set cardinality of relation S. A plot of the equation for various values of k, when the relations have same cardinality k is shown in FIG. 3. The graph shows that, as P increases, the speed decreases initially because of replication. The speed up becomes 1 when $P=r^2$. After this, the speed up starts improving.

In more detail, as the number of partitions begins to increase, initially the speed up decreases because of the increase in the replication factor. However, no tuple can be replicated to a number of partitions greater than the cardinality of its set-valued attribute, so at some point the replication ceases to grow. The number of partitions is also bounded, in this case by N×k (beyond this value, by the pigeon-hole principle, some partitions must be empty.) Hence, the speed up is bounded by N/k.

Of course, this analysis is greatly oversimplified, and in practice, such a speed up is not attainable, because increasing the number of partitions causes overhead of its own. However, the intuition from this simple model is valid, because there is a bound on the replication factor, increasing the number of partitions beyond a certain level will not cause any more replication. Beyond this point, the algorithm may speed up because each of the partitions is smaller and they can thus be joined more efficiently.

Finally, return to the assumption that each pair of partitions is joined using nested loops. Relaxing this assumption and considering faster algorithms for joining partitions does change the predicted speed up factors, but it does not affect the general conclusion of the model (that large numbers of partitions are beneficial because the replication factor is bounded).

4.2 Set Partitioning Algorithm (SPA)

This section describes the SPA of the present invention, which uses very large number of partitions for evaluating the set, containment join. The algorithm first divides the entire input into smaller chunks by breaking the sets into smaller partial sets based on a partitioning function. Then, it joins these individual partitions using the signature nested loops algorithm Finally, the join results from these individual partitions are merged to produce candidate result sets, which are then verified by fetching the actual tuples. In more detail, the SPA algorithm operates in the following four phases:

Partitioning Phase: In this phase, the input relations are partitioned into smaller chunks using a partitioning function. Sets are approximated by signatures. As explained below, the partitioning algorithms map set domain elements to partitions. The signatures are replicated to all partitions to which the corresponding set elements are mapped.

Joining Phase: In this phase, each partition is joined with its "buddy", which produces result partitions containing lists of OID pairs for sets that could satisfy the containment predicate. Note that since signatures are being used, there may be "false hits" in this list.

Merge Phase: The merge phase serves two purposes: the computation of the final candidate OID list and the elimination of duplicates. Since the signatures are replicated, the same OID pairs might occur in many partitions, hence duplicate elimination is required.

Verification Phase: In this phase, the final candidate OID pair list is fetched and checked with the original set instances. Here, an attempt is made to optimize the containment predicate evaluation using efficient nested set representation and to minimize disk seeks while fetching the original tuples from the relation.

The subsequent sections describe each of the phases in detail.

4.2.1 Partitioning Phase

The partitioning phase begins by reading the relation R. For each tuple of R, the 3-tuple (Ci, Si, OIDi) is computed, where Ci is the set cardinality, Si is the signature of the set instance, and OIDi is the OID of the tuple. The partitions to which a tuple has to be replicated are computed as follows: iterate through the set instance in the tuple, and hash each set element to a partition number. For each hash value, set the corresponding bit in the "tuple partition bitmap." At the end of the iteration, all the partitions that should receive this set instance can be found from the tuple partition bitmap. Then, for each partition with the corresponding bit in the partition bitmap set to one, the 3-tuple (Ci, Si, OIDi) is inserted. (Note that the original input relation tuples themselves are not put in partitions, only these 3-tuples.) At this point, the tuple partition bitmap is cleared, and the process is repeated for the next tuple in R, until all R tuples have been processed. Similarly, the relation S is partitioned using the same sequence of steps.

4.2.2 Joining Phase

During the joining phase, each partition of R is joined with its corresponding partition of S. There are many choices of algorithms that can be used at this phase depending upon whether each partition of S fits in memory. The simplest is a signature nested loops join algorithm as described in Section 3.3, which does not have any memory constraints. In the implementation of the preferred embodiment, this algorithm is used. Another candidate is the signature hash join algorithm described in [HEL97]. Since experimental results show that SPA is faster than the alternatives in most cases, and using a faster algorithm in the joining phase would only reinforce that conclusion.

The join of partitions R and Si produces a result partition Ti that contains tuples of the form (OIDiR,OIDjS). The result partition contains the candidate OID pairs that can potentially satisfy the subset containment. Once the join is completed, the result partition Ti is sorted with OIDiR as the primary key and OIDjS as the secondary key to speed the merging phase.

4.2.3 Merging Phase

Here, the individual result partitions Ti ($1 \leq i \leq P$) are merged using a N-way merge to produce the final set of candidates. The merging phase just eliminates duplicates since the same OID pair might be in multiple partitions. The merge phase uses a heap to speed up the lookup operations. The output of the merge phase is the final candidate relation of the form (OIDiR, OIDjS).

4.2.4 Verification Phase

The merging phase provides a result relation having tuples of the form (OIDiR, OIDjS) such that the signature of the join attribute of the S tuple corresponding to OIDjS has a superset of the bits set in the signature of the R tuple corresponding to OIDiR. Since the candidate OID pairs can have potential false hits, it is necessary to examine the actual R and S tuples to determine whether they satisfy the join condition. The main issues involved in this phase are speeding up set containment verification and avoiding random seeks during fetching of the tuples. In order to speed up containment verification, the outer tuple set instances are stored in memory using a hashed representation to facilitate fast probing. On the other hand, the inner tuple set instances are stored in an efficient array representation since they are always accessed sequentially and probed into outer tuple set instances. Using these combinations, the best speed up is obtained for set containment checking. A detailed study of the options for speeding up various pair-wise set operations can be found in [KRJ99].

In order to minimize disk seeks, a strategy described in [VAL87] is employed. The OID pairs relation is already in sorted order with OIDiR as the primary key. This makes the access to R tuples sequential. Now, as many as R tuples are fetched such that the available memory holds (i) tuples of R and its hashed set instances (ii) tuples of S and its set instances in array form and (iii) the corresponding array of (OIDiR, OIDjS) pairs. The OIDs of R are swizzled to point to the R tuples in memory and then the array is sorted on OIDjS, so that the access to tuples of S is sequential. The nested set instances present in the swizzled tuples of R are converted into efficient hashed representations in memory. Then, the S tuples are read sequentially into memory and their nested set-valued attribute is converted into an array representation. The join condition is evaluated for each OID pair by scanning the set instances in S in array representation and probing into the hashed instances of R.

4.2.5 Estimating Number of Partitions

As shown in Section 4.1, the number of partitions has a critical impact on the performance of SPA. The desirable number of partitions depends on two parameters: average set cardinality and relation cardinality of the relations involved. Even though, theoretically, the speed up should increase as the number of partitions is increased, in practice, the overhead associated with each partition prevents such unbounded speed up.

Each phase of the algorithm has its own overhead. The partitioning phase consists of the following overhead: increased I/O due to fragmentation of partition pages, creation of partition files, and manipulation of data structures associated with each partition. The overhead in the join phase includes an increase in I/O cost due to fragmentation, and the sort overhead (creating and deleting intermediate sorted run files). A detailed analytical model was employed to predict the execution time of the algorithm.

Here, the results of the analytical model are summarized. From the analytical model, the optimal number of partitions P is:

$$P = \sqrt{kR \times |R| \times kS \times |S| \times Sc}$$

where kR is the average set cardinality in relation R, kS is the average cardinality in relation S, |R| is the number of tuples in relation R, |S| is the number of tuples in relation S, Sc is the signature comparison cost, and F is a constant fudge factor that varies from system to system. The fudge factor accounts for various system dependent factors including the cost of creating and destroying partition and sort run files, overheads associated with internal fragmentation of partition pages. Generally, the number of partitions should be more than the square of the average cardinality for the set-valued attributes.

For a given system, F can be determined as follows. For a sample data set, run SPA for various number of partitions, and measure the execution time. Divide the minimum execution time by:

$$\sqrt{kR \times |R| \times kS \times |S| \times Sc}$$

to find the value of F. Note that the value of F is computed only once for a system, and not for every run of the algorithm.

Now, examine the case when the number of partitions computed by the above equation exceeds the number of buffer pool pages. From the analysis in Section 4.1, note that SPA outperforms nested loops when the number of partitions is greater than kR×kS. If the number of buffer pool pages available for the join is less than kR×kS, then the signature nested loops join is likely to outperform SPA, and should be chosen by the O/R DBMS.

4.2.6 Logic of the SPA

Figure 4:
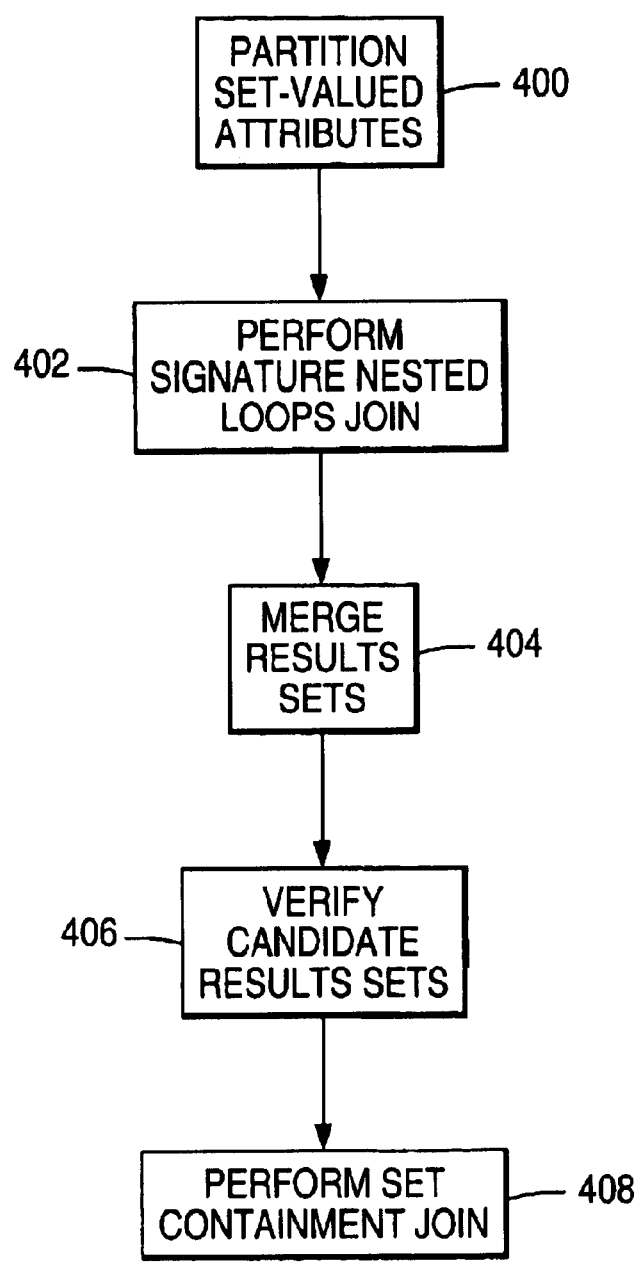
FIG. 4 is a flowchart illustrating the logic of set partitioning algorithm (SPA) according to the preferred embodiment of the present invention.

FIG. 4 is a flowchart illustrating the logic of the method for performing a set containment join operation in a computer-implemented database management system according to the preferred embodiment of the present invention.

Block 400 represents the O/R DBMS partitioning a plurality of set-valued attributes stored in a table, wherein each of the set-valued attributes are unique within the table and the number of partitions for the table is more than the square of an average cardinality for the set-valued attributes. The set-valued attributes, which identify a logical collection, are divided into partitions based on their associated signatures, wherein the signature comprises a fixed length bit vector. The signature is computed by iteratively applying a function to every set-valued attribute in the logical collection, wherein the function maps the set-valued attribute to a bit position in the signature.

Block 402 represents the O/R DBMS performing a signature nested loops join operation to join each partition with a "buddy" partition to create a plurality of results sets. The results sets contain set-valued attributes (or object identifier pairs for the set-valued attributes) that could satisfy the containment predicate (they may contain "false hits").

Block 404 represents the O/R DBMS merging the results sets to produce candidate results sets. The merge eliminates duplicates in the candidate results sets.

Block 406 represents the O/R DBMS verifying the candidate results sets by comparing set-valued attributes in the candidate results sets with the set-valued attributes in the table.

Block 408 represents the O/R DBMS performing a set containment join on the candidate results sets.

5 Performance Evaluation

In this section, the performance of the three set containment algorithms is evaluated: SQL2 for an unnested external representation (UNE), and signature nested loops (SNL) and SPA for nested internal. First, the implementation of these algorithms is described, and then results from various experiments designed to investigate the performance of these algorithms under various conditions are presented.

5.1 Experimental Setup and Data Generation

In experiments implementing the preferred embodiment, the total size of the non-set-valued attributes in a tuple is 68 bytes. The average size of each set element is 30 bytes. The experiments were run on an Intel 333 MHz Pentium processor with 128 MB of main memory running Solaris 2.6. A 4GB data storage device was used for storing the database volume, wherein the device provided I/O bandwidth of 5 MB/sec. The O/R DBMS was configured with a 32 MB buffer pool. Although this buffer pool size may seem small compared to current trends in memory, this value was used to test data sets that are much larger than the buffer pool. As will be seen in the following sections, with this buffer pool size, some experiments take many days to run. Each experiment was run a cold buffer pool to eliminate the effect of caching.

The data generator for the BUCKY benchmark [CAR97] was modified to generate data synthetically. The data generator takes as input the cardinality of the relations R and S, the average cardinality of the set-valued attributes in the two relations, the size of the domain from which the set elements are drawn, and a correlation value.

For each tuple, the set-valued attribute is generated as follows. First, the data generator divides the entire domain into 50 smaller sub-domains. The set elements are drawn from these sub-domains. Set elements are correlated if they are drawn from the same sub-domain. Correlation of a set instance is defined as the percentage of the set elements that are drawn from a single sub-domain.

For example, if the set cardinality is 10, a correlation of 90% implies that 9 set elements are chosen; and one sub-domain and 1 element is randomly chosen from one of the remaining 49 sub-domains. The tuples in relations R and S have same number of tuples and are generated such that every S tuple joins with exactly one R tuple.

5.3 Effect of Signature Size

This section describes the effect of signature size on the performance of SNL and SPA Both algorithms use signatures for producing an intermediate candidate set of result. As noted in Section 3.3, the number of false hits in the candidate set is influenced by the size of the signature. Increasing the signature length reduces the false hit probability, but increases the cost of the signature comparison. To study the effect of signature size, two experiments were set up, as that are described below. For both these experiments, the relational cardinality of the two sets is 10,000, the average cardinality of the set-valued attribute in R and S is 5 and 10, respectively.

Figure 5:
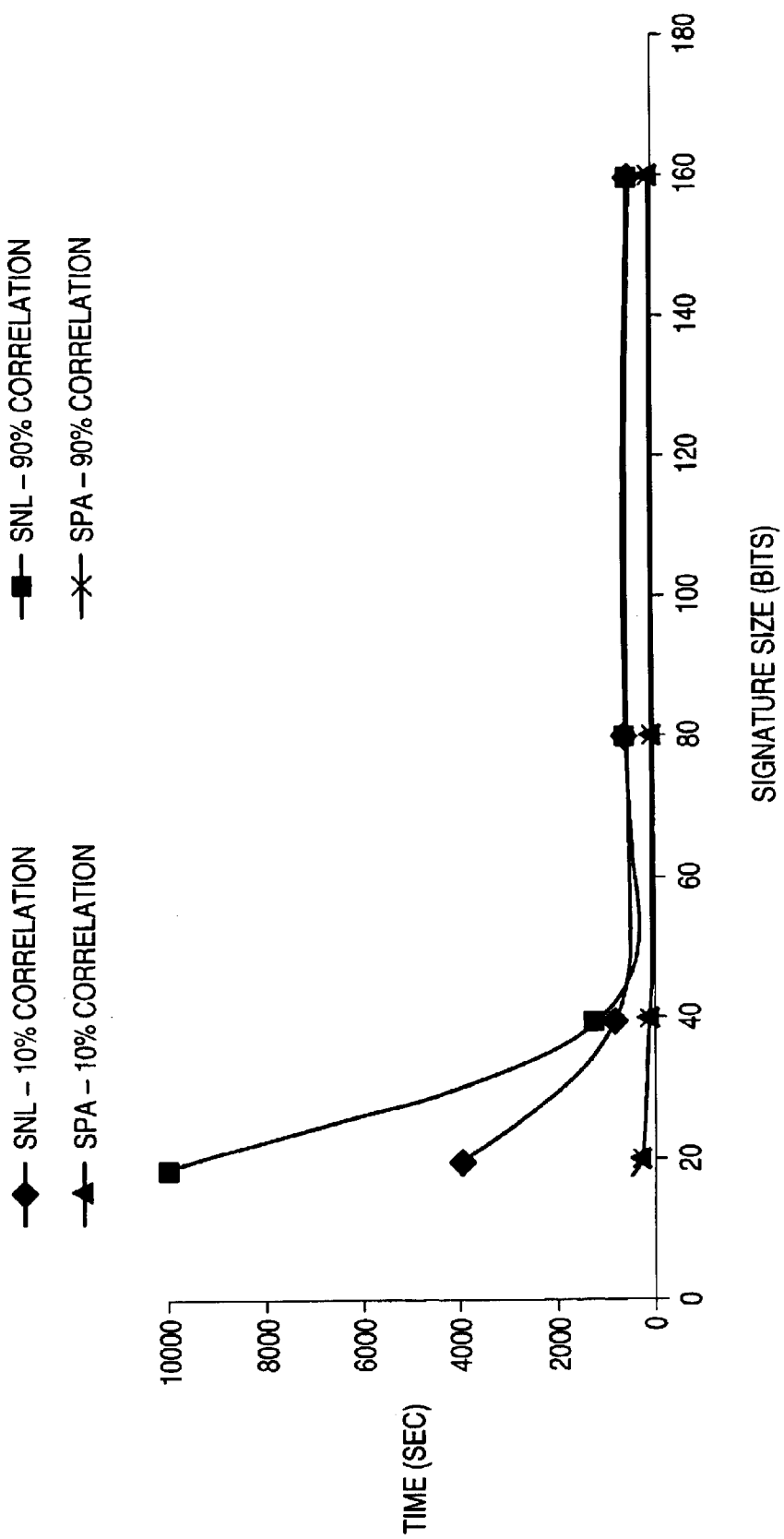
FIG. 5 is a graph illustrating the impact of data correlation on signatures according to the preferred embodiment of the present invention.

In the first experiment, the domain size from which the set elements are drawn is fixed at 10,000, while the correlation for the data set is switched between 10% and 90%. The result of this experiment is plotted in FIG. 5. For smaller signature sizes, SNL is very expensive, since many set elements hash to the same bit, thereby increasing the number of false hits. The false hits increase the time of the verification phase, which then becomes the dominating cost in the algorithm. As the signature size increases, the number of false hits is reduced and the performance of SNL improves. However, beyond a signature size of 40, increasing the signature length does not have any significant effect on the performance of SNL. From the Figure, it can also be observed that SPA is relatively immune to the signature size. Keeping the false hits to a minimum is also critical to the performance of SPA; however, the primary factor influencing the false hits is the partitioning technique, which only compares a subset of R tuples with a subset of S tuples (as opposed to comparing every R tuple with every S tuple). From FIG. 5, also note that SPA consistently outperforms SNL for this experiment.

Figure 6:
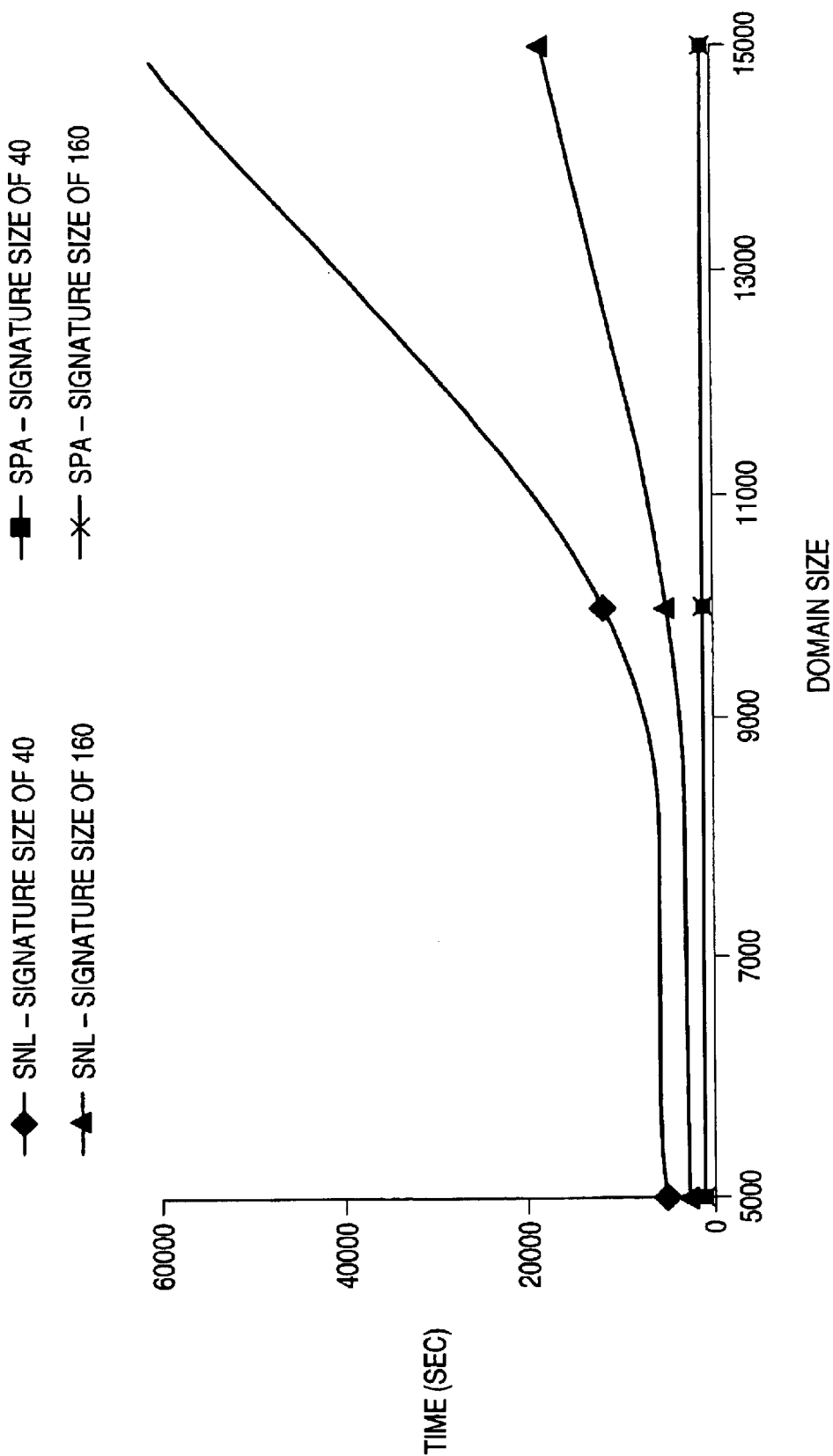
FIG. 6 is a graph illustrating the effect of domain size on signatures according to the preferred embodiment of the present invention.

In the second experiment, the correlation of the data was fixed at 90% and the size of the domain from which the set elements are drawn was varied. The result of this experiment is plotted in FIG. 6. The results show that SNL is very sensitive to changes in the domain size. As the domain size increases, the number of domain values that are mapped to a bit in the signature increases, thereby increasing the number of false hits. As the domain size increases, SNL requires larger signatures to reduce the false hits, thereby improving the performance. SPA, as in the previous experiment, is less affected by the increase in domain size. Again, partitioning, and not signature size, is the primary factor influencing the false hits.

The fact that SPA is less sensitive to signature size than SNL is a big advantage, since determining a signature size that improves performance is very hard [JZ98]. The range of practically useful signature sizes is very strongly dependent on data characteristics and it may be prohibitively expensive to compute this range for every set that needs to be joined.

5.4 Effect of Increasing Partitions on SPA

In this experiment, the effect of the number of partitions on the performance of SPA is studied. For this experiment, the relational cardinality of both relations is set to 10,000, the average set cardinality of R and S is set to 10 and 20, respectively, and the signature size is set to 80 bits. The result for this experiment is shown in FIG. 7.

The Figure shows the total join cost, as well as the partition cost, the partition join cost, and the merge cost. The number of partitions was varied from 4 to 1024, with an average set cardinality of R at 10, an average set cardinality of S at 20, a relation cardinality of 10,000, and a signature size of 4 times the average set cardinality of S. The results are shown in FIG. 7. The graph shows the total join cost, partition cost, partition join cost, and merge cost.

Figure 7:
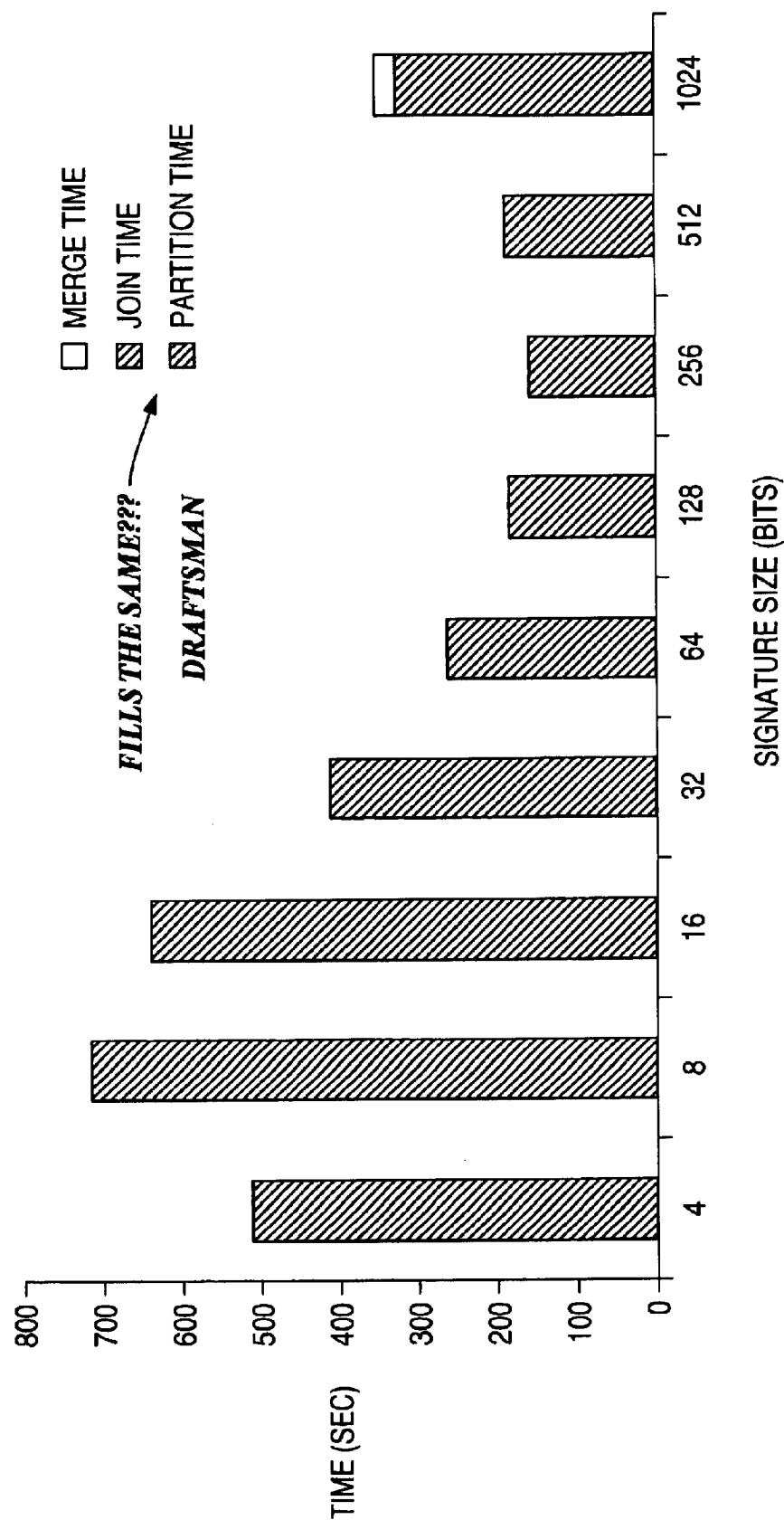
FIG. 7 is a graph illustrating the effect of increasing partitions according to the preferred embodiment of the present invention.

From FIG. 7, it can be observed that that graph has three phases: the first phase in which the total join cost increases sharply as the number of partitions is increased, the second phase in which the total join cost starts reducing gradually, and the third phase in which the total join cost starts increasing as the number of partitions becomes very large.

In the first phase, when the number of partitions is small (much less than average set cardinality) the tuples are replicated in all the partitions, and each partition join is essentially a complete nested loop. Consequently, as the number of partitions increase (from 4 to 8 in the Figure), the join cost increases sharply.

Then, as the number of partitions continues to increase, a limit is reached on the maximum replication that is possible using partitioning. (Recall from the discussion in Section 4.1, that the replication overhead is bounded by be set cardinality. This is when the system moves into the second phase, in which the system starts reaping the benefits of partitioning.

As predicted in Section 4.1, the total join cost decreases as the number of partitions is increased. However, this improvement in performance is not unbounded. This is when the system moves into the third phase. In this phase, the partitioning cost starts rising sharply, and this has an unhealthy effect on the overall join performance. The partition costs rise sharply in this phase, because of the overhead associated with partitions. As discussed in Section 4.2.5, this overhead includes increased I/O due to fragmentation of partition pages, creation of partition files, and manipulation of data structures associated with each partition.

This experiment shows that the number of partitions has a critical impact on the performance of SPA. The equation described in Section 4.2.5 can be used to estimate the optimal number of partitions. For the data set in this experiment, the equation in Section 4.2.5 estimated the optimal number of partitions at 308.

5.5 Varying Set Cardinality

In this experiment, the effect of set cardinality on the performance of the three algorithms is investigated. In this experiment, the relational cardinality for both R and S is set to 25,000 tuples, the signature size is fixed at 64 bits, and the correlation is set to 10%. The average set cardinality of S takes the values of 5, 10 and 20, while the corresponding average set cardinality of R is 2.5, 5 and 10. The number of partitions used in SPA is calculated using the formula in Section 4.2.5. The result of this experiment is plotted in FIG. 8.

The first observation is that the performance of SNL dramatically improves as the set cardinality increases. The reason for this, perhaps counterintuitive, behavior is due to the characteristic behavior of signatures. With a small set cardinality (e.g., 5) for a given tuple, there are very few bits in the signature that are set to 1. When this signature is used for checking containment, the likelihood of falsely matching with another tuple is high since only a small number of bits are set to 1. Consequently, there are a large number of false hits.

When the set cardinality increases, more bits are set to 1 in the signature. The probability of a false hit is now reduced, since for a tuple to match this signature, it must match with the signature in all these bit positions. If p is the probability that a single bit element causes a false hit, then with 7 bits turned on, the probability that the signature causes a false hit is $p^7$. (Note that p varies with the set cardinality.) The exact formulae connecting p and the set cardinality can be found in [JZ98]). As this trend continues, SNL catches up with SPA for large set cardinalities.

Figure 8:
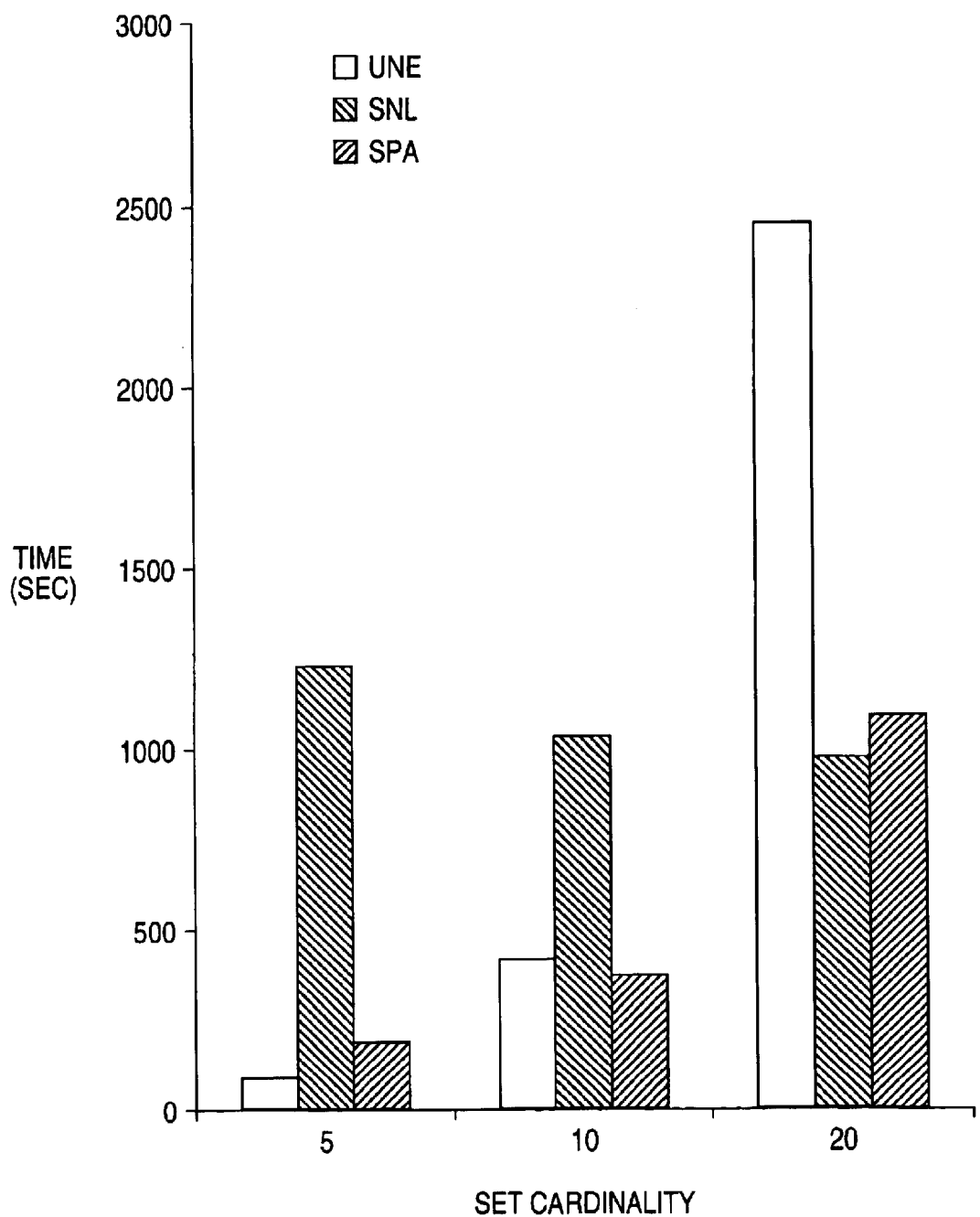
FIG. 8 is a graph illustrating the effect of set cardinality according to the preferred embodiment of the present invention.

From FIG. 8, the second observation is that UNE performs extremely well at very small cardinalities. For small cardinalities, the number of false hits generated by candidate generation query is very low. Since UNE has no overhead associated with creating and comparing signatures, it outperforms the other algorithms. However, as the set cardinality increases, the performance of UNE degrades rapidly.

From this experiment, one can conclude that UNE is the best algorithm for very small set cardinality, and SPA is the best algorithm for joining large relations with moderate set cardinalities. For large set cardinalities, if the number of partitions that SPA needs (as computed by the equation in Section 4.2.5) is smaller than the buffer pool size, then SPA is the best algorithm, otherwise SNL is the best algorithm.

Figure 9:
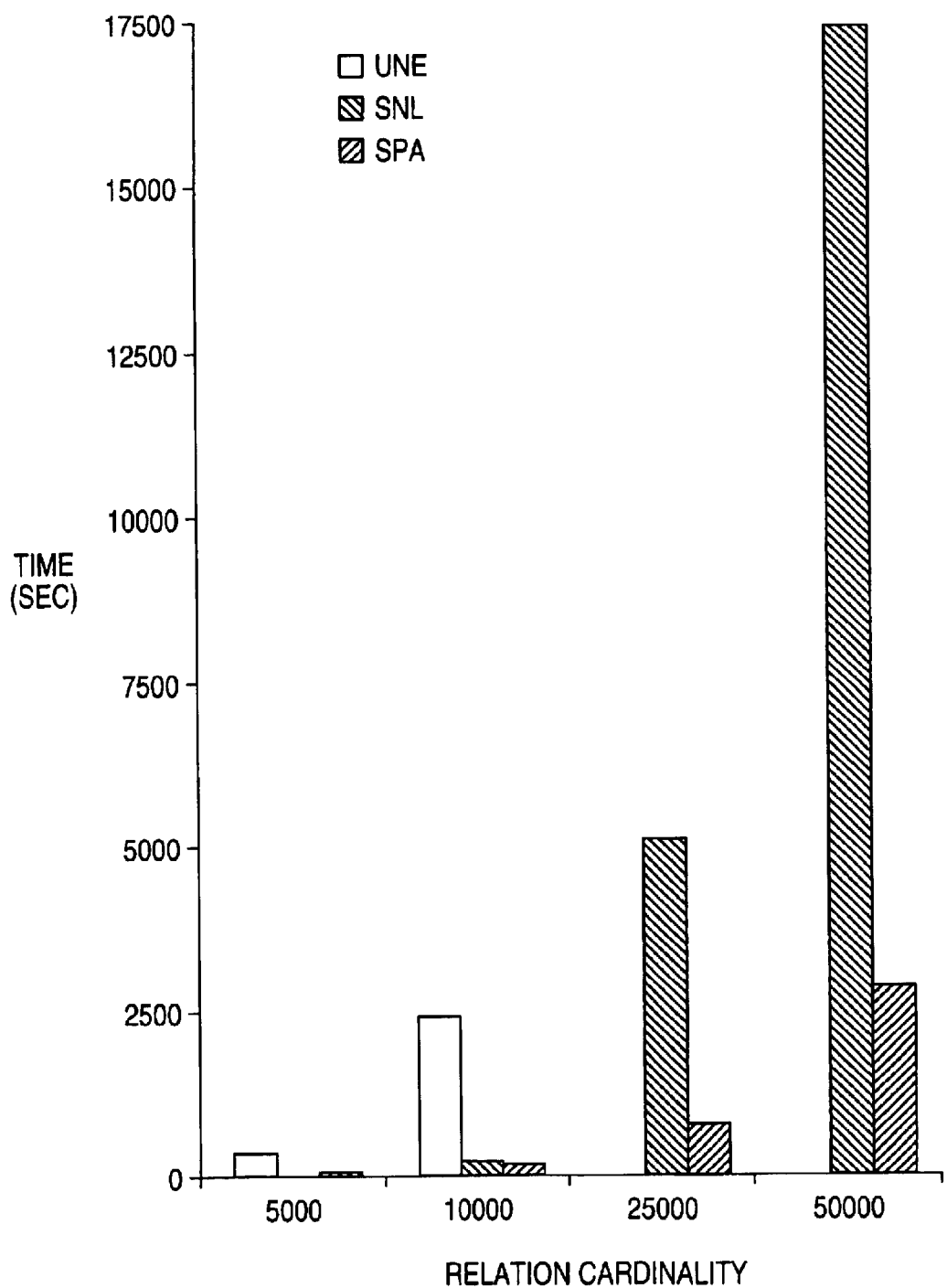
FIG. 9 is a graph illustrating the effect of relational cardinality according to the preferred embodiment of the present invention.

In the final experiment, the effect of varying the relational cardinality is investigated. In this experiment, the average set cardinality of R and S is 10 and 20, respectively, the signature size is set to 64 bits, and the correlation is fixed at 10%. Both R and S have the same relational cardinality that is varied from 5000 to 50000. The result for this experiment is plotted in FIG. 9.

The numbers for UNE for the 25000 and 50000 cases are not included in the above figure, since both these runs took more than 24 hours to complete. As seen from the Figure, SNL outperforms SPA when the relational cardinality is small (examine the case with a relational cardinality of 5000 in the above Figure). When the relation cardinality is small, the overhead associated with partitioning is amortized over a small number of tuples and the overheads outweigh the benefits of partitioning. However, as the relation cardinality increases, the response time for SPA improves rapidly.

SNL suffers from two factors: the signature join time and the verification time. The signature join time increases since the number of signature comparisons is proportional to the product of the relational cardinalities. Consequently, there are many false hits and the verification time increases rapidly. In the case of a relational cardinality of 50000, the cost of signature join time is 3936 seconds, exceeding the overall cost of SPA by 40%. Since partitioning ensures that only the signatures corresponding to each partition are compared, SPA performs better for large relation cardinalities. Again, UNE suffers from the increase in number of tuples; but this time because increase in relation cardinality. This increases the execution time of the candidate generation query.

6 References

[BLA76] M.W. Blasgen and K. P. Eswaran. On the evaluation of queries in a relational database system. Technical Report IBM Research Report RJ1745, 1976.

[BRA84] K. Brathergsengen. Hashing methods and relational algebra operations. In Proceedings of International Conference on Very Large Databases (VLDB), pages 323–333, 1984.

[BRI93] T. Brinkhoff, H. P. Kriegel, and B. Seeger. Efficient processing of spatial join using R-Trees. In Proceedings of the ACM SIGMOD Conference on Management of Data, pages 237–246, 1993.

[CAR97] M. Carey, D. Dewitt, J. F. Naughton, M. Asgarian, P. Brown, J. E. Gerke and D. N. Shah. The BUCKY Object-Relational Benchmark In Proceedings of the ACM SIGMOD Conference on Management of Data, 1997.

[CAT96] R. Cattell, editor. The Object Database Standard. ODMG-93. Morgan Kaufmann, 1996. Release 1.2.

[DW85] D. Dewitt aid R. Gerber. Multiprocessor hash-based join algorithms. In Proceedings of International Conference on Very Large Databases (VLDB), pages 151–164, Stockholm, Sweden, 1985.

[DW84] D. Dewitt, R. Katz, F. Ohlken, L. Shapiro, M. Stonebraker and D. Wood. Implementation techniques for main memory database systems. In Proceedings of the ACM SIGMOD Conference on Management of Data, pages 1–8, 1984.

[DW93] D. Dewitt, D. Lieuwen, and M. Mehta. Pointer-based join techniques for object-oriented databases. In PDIS, 1993.

[DW91] D. Dewitt, J. Naughton, and D. Schneider. An evaluation of non-equijoin algorithms. In Proceedings of International Conference on Very Large Databases (VLDB), pages 443–452, Barcelona, Spain, 1991.

[DWJ91] D. Dewitt, J. Naughton, and D. Schneider. Parallel sorting on a shared-nothing architecture using probabilistic splitting. In PDIS, Miami Beach, Fla., 1991.

[DW90] D. DeWitt, S. Ghandeharizadeh, D. Schneider, A. Bricker, H. Hsiao and R. Rasmussen, "The Gamma Database Machine Project", IEEE Transactions on Data and Knowledge Engineering 2(I), March 1990, pp. 44–63.

[CF84] C Faloutsos and S. Christodoulakis. Signature Files: An access method for documents and its analytical performance evaluation. In ACM Transactions on Office Information Systems, 2(4): 267–288, October 1984.

[FEL57] W. Feller. An Introduction to Probability Theory and Applications, Vol. 1, John Wiley and Sons, 241, 1957.

[FS86] S. Fushimi, M. Kitsuregawa, and H. Tanaka. An overview of the systems software of a parallel relational database machine: GRACE. In Proceedings of International Conference on Very Large Databases (VLDB), pages 209–219, 1986.

[GZ94] G. Graefe. Sort-merge join: An idea whose time has(h) passed? in Proceedings of IEEE Conference on Data Engineering (ICDE), pages 406–417, 1994.

[GZL94] G. Graefe, A. Linville, and L. Shapiro. Sort versus hash revisited. In IEEE Transactions on Data and Knowledge Engineering, 6(6):934–944, December 1994.

[GZL94] O. Gunther. Efficient computation of spatial joins. In Proceedings of IEEE Conference on Data Engineering (ICDE), pages 50–59, Vienna, Austria, April 1993.

[JMH97) On the Analysis of Indexing Schemes. In Proceedings of Principles of Database Systems (PODS), Athens, Greece, 1997.

[HEL96] S. Helmer and G. Moerkotte, Evaluation of main memory join algorithms for joins with set comparison join predicates. Technical Report 13/96, University of Mannheim, Mannheim, Germany, 1996.

[HEL97] S. Helmer and G. Moerkotte, Evaluation of main memory join algorithms for joins with set comparison join predicates. In Proceedings of International Conference on Very Large Databases (VLDB), Athens, Greece, 1997.

[ISH93] Y. Ishikawa, H. Kitagawa, and N. Ohbo, Evaluation of signature files as set access facilities in OODBS. In Proceedings of ACM-SIGMOD Conference on Management of Data, pages 247–256, Washington D.C, 1993.

[LO96] M. Lo and C. Ravishankar. Spatial hash-joins. In Proceedings of ACM-SIGMOD Conference on Management of Data, Montreal, Quebec, May 1996.

[JP96] J. Patel and D. DeWitt, Partition-based spatial merge join, In Proceedings of ACM-SIGMOD Conference on Management of Data, Montreal, Quebec, May 1996.

[JP97] J. Patel. J. Yu, N. Kabra, K. Tufte, B. Nag, J. Burger, N. Hall, K. Ramasamy, R. Lueder, C. Ellman, J. Kupsch, S. Guo, J. Larson, D. DeWitt and J. Naughton, Building a scalable geo spatial DBMS: Technology, Implementation and Evaluation, In Proceedings of ACM-SIGMOD Conference on Management of Data, Tucson, Ariz., May 1997.

[JZ98] J. Zobel, A. Moffat, K. Ramamohanarao, Inverted Files Versus Signature Files for Text Indexing. In ACM Transactions on Database Systems, 23(4):453–490, December 1998.

[KR99] K. Ramasamy, J. Naughton and D. Maier, High performance implementation techniques for set-valued attributes. http://www.cs.wisc.edu~ramasamy/sets.ps.

[KRJ99] K Ramasamy, J. Patel and J. Naughton, Efficient pairwise operations for nested set-valued attributes. Working paper.

[RKS88] M. Roth, H. Korth, A. Silberschatz, Extending Relational Algebra and Calculus for Nested Relational Databases. In ACM Transactions on Database Systems, 13(4):389–417, December 1998.

[PS96] P. Seshadri, H. Pirahesh, T. Y. C Leung, Complex Query Decorrelation. In Proceedings of IEEE Conference on Data Engineering(ICDE), pages 450–458, 1996.

[JAI99] J. Shanmugasundaram, G. He, K. Tufte, C Zhang, D. DeWitt and J. Naughton, Relational Databases for Querying XML Documents: Limitations and Opportunities. To appear, In Proceedings of International Conference on Very Large Databases (VLDB), Scotland, 1999.

[SH90] E. J. Shekita, and M. J. Carey, A performance evaluation of pointer based joins. In Proceedings of ACMSIGMOD Conference on Management of Data, pages 300–311, 1990.

[ST96] M. Stonebraker, "Object-relational DBMS's, The Next Great Wave". Morgan Kaufmann, 1996.

[ZAN83] Carlo Zaniolo, "The Database Language GEM". In Proceedings of 1983 ACM-SIGMOD Conference on Management of Data, San Jose, Calif., May 1983.

Conclusion

This concludes the description of the preferred embodiment of the invention. The following paragraphs describe some alternative embodiments for accomplishing the same invention.

In one alternative embodiment, any type of computer could be used to implement the present invention. In addition, any DBMS or other program that performs similar functions could be used with the present invention.

In summary, the present invention discloses a method, apparatus, and article of manufacture for performing a novel partition-based set containment join algorithm, known as Set Partitioning Algorithm (SPA). The SPA is performed by a relational database management system to aggressively partition set-valued attributes into a very large number of partitions, in order to minimize the impact of excessive replication and improve performance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for performing a set containment join operation in a computer-implemented database management system, comprising:

(a) partitioning a plurality of set-valued attributes stored in a nested internal representation in a table, wherein each of the set-valued attributes are unique within the table and a number of partitions for the table is more than a square of an average cardinality for the set-valued attributes; and (b) performing a set containment join on the partitioned set-valued attributes.

2. The method of claim 1, wherein the partitioned step comprises:

dividing the set-valued attributes stored in the table into a plurality of partitions;

performing a signature nested loops join operation on the partitions to create a plurality of results sets;

merging the results sets from the signature nested loops join operation to produce candidate results sets; and verifying the set-valued attributes in the candidate results sets.

3. The method of claim 2, wherein the dividing step comprises dividing the set-valued attributes into partitions based on their associated signatures.

4. The method of claim 3, wherein the signature associated with a set-valued attribute comprises a fixed length bit vector.

5. The method of claim 3, wherein the set-valued attributes identify a logical collection and the signature associated with a set-valued attribute is computed by iteratively applying a function to every set-valued attribute in the logical collection.

6. The method of claim 5, wherein the function maps the set-valued attribute to a bit position in the signature.

7. The method of claim 2, wherein the performing step comprises performing the signature nested loops join operation on each partition with a buddy partition for the partition.

8. The method of claim 7, wherein the results sets contain set-valued attributes that could satisfy a containment predicate for the set containment join.

9. The method of claim 7, wherein the set-valued attributes include false hits.

10. The method of claim 2, wherein the merging step comprises computing the candidate results sets and eliminating duplicates in the candidate results sets.

11. The method of claim 2, wherein the verifying step comprises comparing the set-valued attributes in the candidate results sets with the set-valued attributes in the table.

12. An apparatus for performing a set containment join operation, comprising:
   (a) a computer-implemented database management system executed by a computer;
   (b) logic, performed by the computer-implemented database management system, for:
      (1) partitioning a plurality of set-valued attributes stored in a nested internal representation in a table, wherein each of the set-valued attributes are unique within the table and a number of partitions for the table is more than a square of an average cardinality for the set-valued attributes; and
      (2) performing a set containment join on the partitioned set-valued attributes.

13. The apparatus of claim 12, wherein the logic for partitioning comprises:
   logic for dividing the set-valued attributes stored in the table into a plurality of partitions;
   logic for performing a signature nested loops join operation on the partitions to create a plurality of results sets;
   logic for merging the results sets from the signature nested loops join operation to produce candidate results sets; and
   logic for verifying the set-valued attributes in the candidate results sets.

14. The apparatus of claim 13, wherein the logic for dividing comprises logic for dividing the set-valued attributes into partitions based on their associated signatures.

15. The apparatus of claim 14, wherein the signature associated with a set-valued attribute comprises a fixed length bit vector.

16. The apparatus of claim 14, wherein the set-valued attributes identify a logical collection and the signature associated with a set-valued attribute is computed by iteratively applying a function to every set-valued attribute in the logical collection.

17. The apparatus of claim 16, wherein the function maps the set-valued attribute to a bit position in the signature.

18. The apparatus of claim 13, wherein the logic for perform comprises logic for performing the signature nested loops join operation on each partition with a buddy partition for the partition.

19. The apparatus of claim 18, wherein the results sets contain set-valued attributes that could satisfy a containment predicate for the set containment join.

20. The apparatus of claim 18, wherein the set-valued attributes include false hits.

21. The apparatus of claim 13, wherein the logic for merging comprises logic for computing the candidate results sets and eliminating duplicates in the candidate results sets.

22. The apparatus of claim 13, wherein the logic for verifying comprises logic for comparing the set-valued attributes in the candidate results sets with the set-valued attributes in the table.

23. An article of manufacture embodying logic for performing a set containment join operation in a computer-implemented database management system, comprising:
   (a) partitioning a plurality of set-valued attributes stored in a nested internal representation in a table, wherein each of the set-valued attributes are unique within the table and a number of partitions for the table is more than a square of an average cardinality for the set-valued attributes; and
   (b) performing a set containment join on the partitioned set-valued attributes.

24. The article of manufacture of claim 23, wherein the logic for partitioning comprises:
   logic for dividing the set-valued attributes stored in the table into a plurality of partitions;
   logic for performing a signature nested loops join operation on the partitions to create a plurality of results sets;
   logic for merging the results sets from the signature nested loops join operation to produce candidate results sets; and
   logic for verifying the set-valued attributes in the candidate results sets.

25. The article of manufacture of claim 24, wherein the logic for dividing comprises logic for dividing the set-valued attributes into partitions based on their associated signatures.

26. The article of manufacture of claim 25, wherein the signature associated with a set-valued attribute comprises a fixed length bit vector.

27. The article of manufacture of claim 25, wherein the set-valued attributes identify a logical collection and the signature associated with a set-valued attribute is computed by iteratively applying a function to every set-valued attribute in the logical collection.

28. The article of manufacture of claim 27, wherein the function maps the set-valued attribute to a bit position in the signature.

29. The article of manufacture of claim 24, wherein the logic for comprises logic for performing the nested signature loops join operation on each partition with a buddy partition for the partition.

30. The article of manufacture of claim 29, wherein the results sets contain set-valued attributes that could satisfy a containment predicate for the set containment join.

31. The article of manufacture of claim 29, wherein the set-valued attributes include false hits.

32. The article of manufacture of claim 23, wherein the logic for merging comprises logic for computing the candidate results sets and eliminating duplicates in the candidate results sets.

33. The article of manufacture of claim 23, wherein the logic for verifying comprises logic for comparing the set-valued attributes in the candidate results sets with the set-valued attributes in the table.

* * * * *

UNITED STATES PATENT AND TRADEMARK OFFICE
CERTIFICATE OF CORRECTION

PATENT NO.    : 6,728,694 B1
DATED         : April 27, 2004
INVENTOR(S)   : Ramasamy, K., Patel, J. M. and Naughton, J. F.

It is certified that error appears in the above-identified patent and that said Letters Patent is hereby corrected as shown below:

Column 21,
Line 43, before "comprises" delete "perform" and insert -- performing --.

Signed and Sealed this

Twenty-seventh Day of December, 2005

JON W. DUDAS
*Director of the United States Patent and Trademark Office*